US009233876B2

(12) United States Patent
Marazzani et al.

(10) Patent No.: US 9,233,876 B2
(45) Date of Patent: Jan. 12, 2016

(54) HARDENING ACCELERATOR FOR MINERAL BINDER COMPOSITIONS

(71) Applicant: SIKA TECHNOLOGY AG, Baar (CH)

(72) Inventors: Beat Marazzani, Oberengstringen (CH);
Christian Bürge, Schafisheim (CH);
Christophe Kurz, Endingen (CH);
Gilbert Mäder, Marthalen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/090,639

(22) Filed: Nov. 26, 2013

(65) Prior Publication Data

US 2014/0076205 A1     Mar. 20, 2014

Related U.S. Application Data

(63) Continuation of application No. PCT/EP2012/059904, filed on May 25, 2012.

(30) Foreign Application Priority Data

May 26, 2011 (EP) .................................... 11167672

(51) Int. Cl.
| C04B 24/12 | (2006.01) |
| C04B 28/02 | (2006.01) |
| C04B 24/28 | (2006.01) |
| C04B 28/04 | (2006.01) |
| C04B 40/00 | (2006.01) |
| C04B 103/14 | (2006.01) |

(52) U.S. Cl.
CPC ............. *C04B 24/283* (2013.01); *C04B 24/121* (2013.01); *C04B 24/122* (2013.01); *C04B 28/04* (2013.01); *C04B 40/0039* (2013.01); *C04B 2103/14* (2013.01)

(58) Field of Classification Search
CPC .. C04B 24/122; C04B 24/283; C04B 24/124; C04B 24/2647; C04B 28/04; C04B 40/0039; C04B 2103/14
USPC ................................................ 106/727, 808
See application file for complete search history.

(56) References Cited

U.S. PATENT DOCUMENTS

| 4,943,323 | A | 7/1990 | Gartner et al. |
| 4,990,190 | A | 2/1991 | Myers et al. |
| 5,017,234 | A | 5/1991 | Gartner et al. |
| 5,084,103 | A | 1/1992 | Myers et al. |
| 5,156,679 | A | 10/1992 | Gartner et al. |
| 5,348,583 | A | 9/1994 | Arfaei et al. |
| 5,429,675 | A | 7/1995 | Cheung et al. |
| 6,048,393 | A | 4/2000 | Cheung et al. |
| 6,290,772 | B1 | 9/2001 | Cheung et al. |
| 6,358,311 | B1 | 3/2002 | Arai et al. |
| 2004/0244655 | A1 | 12/2004 | Buerge et al. |
| 2006/0086291 | A1 | 4/2006 | Jardine |
| 2009/0050023 | A1 | 2/2009 | Buerge et al. |
| 2014/0076203 | A1 | 3/2014 | Marazzani et al. |
| 2014/0150694 | A1 | 6/2014 | Marazzani et al. |

FOREIGN PATENT DOCUMENTS

| CN | 1107127 A | 8/1995 |
| CN | 1223235 A | 7/1999 |
| EP | 0 415 799 A2 | 3/1991 |
| EP | 1 348 729 A1 | 10/2003 |
| EP | 1 138 697 B1 | 11/2003 |
| EP | 1 061 089 B1 | 3/2004 |
| EP | 1 561 735 A1 | 8/2005 |
| KR | 10-0893585 B1 | 4/2009 |
| WO | WO 03/000617 A1 | 1/2003 |
| WO | WO 2005/123621 A1 | 12/2005 |
| WO | 2011/022217 A1 | 2/2011 |
| WO | WO 2012/160211 A1 | 11/2012 |

OTHER PUBLICATIONS

Notification of Transmittal of Translation of International Preliminary Report on Patentability (Forms PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059904. (7 pages).
Notification of Transmittal of Translation of International Preliminary Report on Patentability (Forms PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059906. (9 pages).
Notification of Transmittal of Translation of International Preliminary Report on Patentability (Forms PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059908. (8 pages).
"How to Sculpt with Concrete". WikiHow. May 2, 2008 [Retrieved on Sep. 13, 2014]. Retieved from http://web.archive.org/web/20080502193504/http:/www.wikihow.com/Sculpt-With-Concrete. (2 pages).
International Search Report (PCT/ISA/210) mailed on Aug. 6, 2012, by the European Patent Office as the International Searching Authority for International Application No. PCT/EP2012/059906.
Written Opinion (PCT/ISA/237) mailed on Aug. 6, 2012, by the European Patent Office as the International Searching Authority for International Application No. PCT/EP2012/059906.
International Search Report (PCT/ISA/210) mailed on Aug. 6, 2012, by the European Patent Office as the International Searching Authority for International Application No. PCT/EP2012/059904.

(Continued)

*Primary Examiner* — Anthony J Green
(74) *Attorney, Agent, or Firm* — Buchanan Ingersoll & Rooney PC

(57) ABSTRACT

A hardening accelerator for mineral binder compositions, in particular for cementitious binder compositions, is provided. The hardening accelerator contains a combination of a) a first amino alcohol (A) including at least one primary alcohol group, and b) a second amino alcohol (E) including at least one secondary alcohol group.

18 Claims, No Drawings

(56) References Cited

OTHER PUBLICATIONS

Written Opinion (PCT/ISA/237) mailed on Aug. 6, 2012, by the European Patent Office as the International Searching Authority for International Application No. PCT/EP2012/059904.
International Search Report (PCT/ISA/210) mailed on Aug. 6, 2012, by the European Patent Office as the International Searching Authority for International Application No. PCT/EP2012/059908.
Written Opinion (PCT/ISA/237) mailed on Aug. 6, 2012, by the European Patent Office as the International Searching Authority for International Application No. PCT/EP2012/059908.
Chinese Office Action issued in Chinese Patent Application No. 201280019856.2 dated Jan. 6, 2015, 9 pages.
Office Action issued in copending U.S. Appl. No. 14/090,511 dated Nov. 20, 2014, 16 pages.
Office Action issued in copending U.S. Appl. No. 14/090,375 dated Jun. 23, 2014, 7 pages.
Office Action issued in copending U.S. Appl. No. 14/090,375 dated Oct. 1, 2014, 18 pages.
Chinese Office Action issued in Chinese Patent Application No. 201280019835.0 dated Feb. 25, 2015.
U.S. Appl. No. 14/090,511, filed Nov. 26, 2013 naming as inventors Beat Marazzani et al.
U.S. Appl. No. 14/090,375, filed Nov. 26, 2013 naming as inventors Beat Marazzani et al.

HARDENING ACCELERATOR FOR MINERAL BINDER COMPOSITIONS

RELATED APPLICATION(S)

This application claims priority as a continuation application under 35 U.S.C. §120 to PCT/EP2012/059904, which was filed as an International Application on May 25, 2012 designating the U.S., and which claims priority to European Application No. 11167672.2 filed in Europe on May 26, 2011. The entire contents of these applications are hereby incorporated by reference in their entireties.

FIELD

The disclosure relates to hardening accelerators for mineral binder compositions and to a mineral binder composition containing a hardening accelerator. The disclosure further relates to a molded body, which can be obtained by curing a mineral binder composition, and to several uses of a hardening accelerator.

BACKGROUND INFORMATION

Hardening accelerators are used in mineral binders for hardening binder compositions after mixing with water. Hardening accelerators can be used, for example, in order to cast concrete at low temperatures or to increase the early strength of mortar or concrete compositions.

In this context, various substances can be used which accelerate the hardening of mineral binders, for example, cementitious binders. Such substances include, for example, hardening accelerators based on amino alcohols, halides, pseudohalides, nitrites, nitrates, aluminum salts, alkali hydroxides, alkaline earth hydroxides, glycols, glycerol, or $\alpha$-hydroxycarboxylic acids.

WO 2003/000617 A1 (Sika AG) describes, for example, a hardening accelerator based on an alkanolamine, an inorganic nitrate, a carboxylic acid, and a polyol.

However, the known hardening accelerators have various disadvantages. Thus, in the case of halides, pseudohalides, nitrites and nitrates in concrete, there is a risk of stress crack corrosion of pre-stressing steels. Alkali hydroxides, aluminum salts, glycols and glycerols often have an undesired stiffening behavior, and $\alpha$-hydroxycarboxylic acids are dosage sensitive. Therefore, there continues to be a demand for improved hardening accelerators for mineral binders, which do not have the above-mentioned disadvantages.

SUMMARY

According to an exemplary aspect, disclosed is a hardening accelerator for a mineral binder composition, the hardening accelerator comprising: a) a first amino alcohol (A) comprising at least one primary alcohol group, and b) a second amino alcohol (E) comprising at least one secondary alcohol group.

According to an exemplary aspect, disclosed is a binder composition, comprising: a mineral binder, and an exemplary hardening accelerator.

According to an exemplary aspect, disclosed is a molded body obtained by curing an exemplary binder composition after an addition of water.

According to an exemplary aspect, disclosed is a method for preparing a mineral binder composition, the method comprising adding an exemplary hardening accelerator to a mineral binder.

DETAILED DESCRIPTION

The disclosure provides an improved hardening accelerator for mineral binder compositions. The hardening accelerator according to the disclosure can make it possible to achieve, for example, higher early compressive strengths of mortar and/or concrete compositions, in comparison to known hardening accelerators.

It has been discovered surprisingly that the problem according to the disclosure can be solved with a hardening accelerator according to an exemplary aspect.

Accordingly, a hardening accelerator according to an exemplary aspect contains a combination of:
a) a first amino alcohol (A) including at least one primary alcohol group, and
b) a second amino alcohol (E) including at least one secondary alcohol group.

It has been shown that the early compressive strength of mineral binder compositions can be increased significantly by the exemplary combination of amino alcohols, for example, to an extent which is above the maximum achievable early compressive strength at optimal dosage of only one of the two amino alcohols (A) or (E). For example, the exemplary combination of amino alcohols makes it even possible to achieve early compressive strengths that are higher than the sum of the early compressive strengths of the individual amino alcohols at optimal dosages. In other words, the amino alcohols work synergistically together in the exemplary combination.

Compared to a control without added hardening accelerator, the early compressive strengths can be increased after 24 hours or 1 day by up to 22% with the hardening accelerators according to the disclosure.

Surprisingly, it has also been discovered that, owing to the exemplary combination, the required quantities of amino alcohols can be reduced in part in comparison to the individually used amino alcohols, and at the same time an improvement of the early compressive strength can be achieved.

In addition, it has been discovered that exemplary hardening accelerators are not problematic with regard to undesired stiffening behavior of cementitious systems. For example, owing to the composition of the hardening accelerators according to the disclosure, the risk of stress crack corrosion of pre-stressing steels in concrete structures is low when the hardening accelerators are used. Moreover, the dosage sensitivity is low in comparison to known hardening accelerators.

A first aspect of the present disclosure relates to a hardening accelerator for mineral binder compositions, containing a combination of a) a first amino alcohol (A) including at least one primary alcohol group, and b) a second amino alcohol (E) including at least one secondary alcohol group.

The two amino alcohols (A) and (E) are chemically distinguishable substances.

The first and the second amino alcohols are designated with the letters A and E, respectively, merely for the sake of clarity. This designation should in no way be understood to be limiting.

The two amino alcohols (A) and (E) can be present independently of each other, as such and/or in the form of salts. Accordingly, amino alcohols as such are not salts. Mixtures of salts and amino alcohols as such are also possible. In an exemplary embodiment, the first amino alcohol (A) and the second amino alcohol (E) are used as such or as pure substances. In this case, the two amino alcohols (A) and (E) are accordingly not in the form of salts. This facilitates, for example, the production or the preparation of the amino alcohols.

The term "mineral binder" denotes a binder which reacts in the presence of water in a hydration reaction to form solid hydrates or hydrate phases. This can be, for example, a hydraulic binder (for example, a cement or a hydraulic lime), a latent hydraulic binder (for example, slag), a pozzolanic binder (for example, fly ash) or a nonhydraulic binder (gypsum or calcium lime). The term "cementitious binder" or "cementitious binder composition" here denotes a binder or a binder composition having a proportion of at least 5 wt %, for example, at least 20 wt %, for example, at least 35 wt %, for example, at least 65 wt % cement clinker. The cement clinker can be a Portland cement clinker. In the present context, cement clinker denotes a ground cement clinker.

For example, the mineral binder or the binder composition contains a hydraulic binder, for example, a cement. A cement having a cement clinker proportion of ≥35 wt % can be used. For example, the cement is of the CEM I type (according to the standard EN 197-1). A proportion of the hydraulic binder in the entire mineral binder can be at least 5 wt %, for example, at least 20 wt %, for example, at least 35 wt %, for example, at least 65 wt %. According to an additional exemplary embodiment, the mineral binder contains at least 95 wt % hydraulic binder, for example, cement clinker.

It can also be desirable if the binder composition contains other binders in addition to or instead of a hydraulic binder. They are, for example, latent hydraulic binders and/or puzzolanic binders. Suitable latent hydraulic and/or pozzolanic binders are, for example, slag, fly ash and/or silica dust. Similarly, the binder composition can contain inert substances, such as, for example, limestone meal, quartz meal and/or pigments. In an exemplary embodiment, the mineral binder contains 5-95 wt %, for example, 5-65 wt %, for example, 15-35 wt % latent hydraulic and/or pozzolanic binders.

In general, alcohols or alcohol groups are classified by the number of non-hydrogen neighbors of the carbon atom on which the hydroxyl group is located. In the case of primary alcohols or alcohol groups, the hydroxyl group-bearing carbon atom bears exactly two hydrogen atoms and one non-hydrogen atom; in the case of secondary alcohols, it bears exactly one hydrogen atom and two non-hydrogen atom, and in the case of tertiary alcohols, it bears no hydrogen atom at all and three non-hydrogen atoms.

In the present context, a "primary alcohol group" denotes a group of the following formula (I), and a "secondary alcohol group" in the present case is a group of the following formula (II):

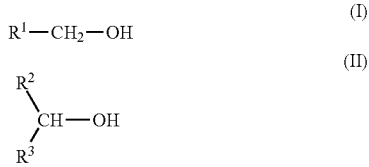

wherein $R^1$, $R^2$ and $R^3$ here represent organic residues which are bound via non-hydrogen atoms, for example, carbon atoms, to the hydroxyl group-bearing carbon atom.

A similar classification also exists for amines or amine groups. An amine group which bears precisely two hydrogen atoms and one non-hydrogen atom is referred to as a primary amine group. An amine group which bears exactly one hydrogen atom and two non-hydrogen atoms is referred to as a secondary amine group, while an amine group which bears no hydrogen atom and three non-hydrogen atoms is referred to as a tertiary amine group.

In the present context, a "primary amine group" therefore denotes a group of the following formula (III), a "secondary amine group" is a group of the following formula (IV), and a "tertiary amine group" accordingly denotes a group of the following formula (V):

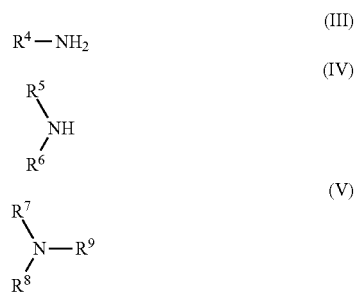

wherein $R^4$, $R^5$, $R^6$, $R^7$, $R^8$ and $R^9$ here represent organic residues that are bound via non-hydrogen atoms, for example, carbon atoms, to the nitrogen atom.

In the present context, "early compressive strength" denotes a compressive strength after 24 hours. The compressive strengths are defined according to the standard EN 12390-3.

According to an exemplary embodiment, the first amino alcohol (A) comprises at least two primary alcohol groups. For example, it can also be advantageous if the first amino alcohol (A) comprises at least three primary alcohol groups.

For example, all the alcohol groups of the first amino alcohol (A) can be primary alcohol groups. In this case, the first amino alcohol comprises, for example, no secondary and/or tertiary alcohol groups.

For example, the first amino alcohol (A) comprises at least one primary and/or at least one secondary amine group. The first amino alcohol (A) can comprise exclusively primary and/or secondary amine groups. For example, the first amino alcohol (A) contains no tertiary amine group.

It is also possible for the first amino alcohol (A) to comprise both primary and also secondary alcohol groups. Similarly, the first amino alcohol can comprise, for example, primary, secondary and/or tertiary amine groups. It can be advantageous for the number of primary alcohol groups in the first amino alcohol (A) to be greater than the number of secondary alcohol groups. It can be advantageous for the number of primary alcohol groups plus the number of the primary and secondary amine groups in the first amino alcohol A to be greater than the number of secondary alcohol groups plus the number of the tertiary amine groups.

The first amino alcohol (A) can be selected, for example, from N-ethyldiethanolamine (EDEA), N-butyldiethanolamine (BDEA), triethanolamine (TEA), 2-(diisopropylamino)ethanol, 2-(2-aminoethylamino)ethanol, N,N,N'-trimethylaminoethylethanolamine, N,N'-bis-(2-hydroxyethyl)ethylenediamine, N-methyldiethanolamine (MDEA), diethanolamine (DEA), 2-amino-2-methyl-1,3-propanediol (AMPD), tris(hydroxymethyl)aminomethane (TRIS), 3-amino-1,2-propanediol (APD) and/or 2-(2-aminoethoxy)ethanol. However, other amino alcohols can also be used.

The first amino alcohol (A) optionally comprises no triethanolamine (TEA).

It can be advantageous for the first amino alcohol (A) to be tris-(hydroxymethyl)aminomethane (TRIS), N-methyldiethanolamine (MDEA), diethanolamine (DEA) and/or 2-amino-2-methyl-1,3-propanediol (AMPD). For example, the first amino alcohol (A) is tris-(hydroxymethyl)aminomethane (TRIS) and/or N-methyldiethanolamine (MDEA).

These representatives of amino alcohols (A) can be suitable with a view to the advantages according to the disclosure. For example, strong effects can be achieved with the last-mentioned amino alcohols at low dosages.

The second amino alcohol (E), for example, has at least two secondary alcohol groups. In an exemplary embodiment, all the alcohol groups of the second amino alcohol (E) are exclusively secondary alcohol groups. For example, the second amino alcohol (E) in this case contains no primary and/or tertiary alcohol groups.

For example, the second amino alcohol (E) comprises a tertiary amine group. For example, the second amino alcohol (E) contains exclusively tertiary amine groups.

However, it is also possible, for the second amino alcohol (E) to comprise both primary and also secondary alcohol groups. Similarly, the first amino alcohol can comprise primary, secondary and/or tertiary amine groups. In both cases, it can be advantageous for the number of secondary alcohol groups in the second amino alcohol (E) to be greater than the number of primary alcohol groups. In these cases, it can be advantageous for the number of secondary alcohol groups plus the number of the tertiary amine groups in the second amino alcohol (E) to be greater than the number of primary alcohol groups plus the number of primary and secondary amine groups.

The second amino alcohol (E) can be selected, for example, from diisopropanolamine (DiPA), triisopropanolamine (TiPA), N,N,N',N'-tetrakis(2-hydroxypropyl)ethylenediamine (THPED) and/or N-methyldiisopropanolamine (MDiPA).

According to an exemplary embodiment, the second amino alcohol (E) is triisopropanolamine (TiPA), N,N,N',N'-tetrakis(2-hydroxypropyl)ethylenediamine (THPED) and/or N-methyldiisopropanolamine (MDiPA). It can be advantageous for the second amino alcohol (E) to be N-methyldiisopropanolamine (MDiPA).

Such amino alcohols (E) can be advantageous in combination with the above-mentioned amino alcohols (A).

According to an exemplary embodiment, the first amino alcohol (A) and/or the second amino alcohol (E) consist(s) exclusively of C, H, N and O atoms.

The molecular weight $M_w$ of the first amino alcohol (A) and/or of the second amino alcohol (E) can be in the range of 60-500 g/mol, for example, 80-300 g/mol, for example, 100-300 g/mol. A molecular weight per alcohol group ($M_w$/OH number) of the first amino alcohol (A) and/or of the second amino alcohol (E) can be in the range of 30-150 g/mol, for example, 35-120 g/mol.

Amino alcohols having such molecular weights can have an optimal effect as components of the acceleration hardener according to the disclosure.

The first amino alcohol (A) and/or the second amino alcohol (E) can be a β-amino alcohol. This means that the amine group in the first amino alcohol (A) and/or in the second amino alcohol (E) can be bound relative to the hydroxyl group in the β position or to a β carbon. In the case of several alcohol groups and/or amine groups, this can apply to all these functional groups. Accordingly, the hydroxyl group of the alcohol group and the nitrogen atom of the amine group can be bound, for example, to two different and directly adjacent carbon atoms.

Similarly, it can be advantageous if, in the first amino alcohol (A) and/or in the second amino alcohol (E), the number of alcohol groups is greater than the number of amine groups. For example, the number of alcohol groups or hydroxyl groups is equal to the number of the amine groups plus 1, 2, 3 or 4. As a result, an optimal effect can be achieved.

It can be advantageous for a weight ratio of the first amino alcohol (A) to the second amino alcohol (E) to be in the range of 100:1-1:100, for example, 50:1-1:50, for example, 10:1-1:10. Such weight ratios can yield high early values.

The first amino alcohol (A) and/or the second amino alcohol (E) can be used, for example, as a pure substance, for example, with a purity of ≥95 wt %.

Independently of each other, the two amino alcohols (A) and (E) can be used in liquid form, for example, as a solution or dispersion. Aqueous solutions and/or dispersions can be used having a proportion of amino alcohols of 5-99 wt %, for example, 20-70 wt %, for example, 40-60 wt %. In this manner, an optimal mixing can be achieved.

It is possible to use one of the two amino alcohols as a pure substance and the other of the two amino alcohols as a solution or dispersion.

The two amino alcohols (A) and (E) can be used independently of each other, in a solid form, for example, as a powder and/or applied on a solid support material.

According to an additional exemplary embodiment, there is at least one additional hardening accelerating substance present in the hardening accelerator according to the disclosure.

A plurality of substances known to the person skilled in the art can be used for this purpose. It can be advantageous if the additional hardening accelerating substance comprises one or more of the following representative substances:
a) one or more alkali and/or alkaline earth nitrates;
b) one or more alkali and/or alkaline earth nitrites;
c) one or more alkali and/or alkaline earth thiocyanates;
d) one or more α-hydroxycarboxylic acids;
e) one or more alkali and/or alkaline earth halides;
f) glycerol and/or glycerol derivatives;
g) one or more glycols and/or glycol derivatives;
h) one or more aluminum salts;
i) one or more alkali and/or alkaline earth hydroxides.

Exemplary combinations of amino alcohols with these representative substances can be compatible.

Similarly, it can be advantageous if the hardening accelerator contains at least one additive, for example, a concrete additive and/or a mortar additive. The at least one additive can comprise a defoaming agent, a dye, a preservative, a liquifier, a retarding agent, an air pore forming agent, a shrinkage reducing agent and/or a corrosion inhibitor, or combinations thereof.

For example, the at least one additive can contain a liquifier. Said liquifier contains, for example, a polycarboxylate, for example, a polycarboxylate ether. For example, the liquifier is a comb polymer including a polycarboxylate backbone with polyether side chains attached thereto. The side chains here are bound, for example, via ester, ether and/or amide groups to the polycarboxylate backbone.

Corresponding polycarboxylate ethers and manufacturing methods are disclosed, for example, in EP 1 138 697 B1 on page 7, line 20 to page 8, line 50, as well as in the examples thereof or in EP 1 061 089 B1, on page 4, line 54 to page 5, line 38 as well as in the examples thereof. As described in EP 1 348 729 A1 on page 3 to page 5 as well as in the examples thereof, the comb polymer can be produced in the solid aggregate state. The disclosures of the above documents are incorporated by reference herein.

Such comb polymers are also marketed commercially by Sika Schweiz AG under the commercial name series Visco-Crete®.

An additional aspect of the present disclosure relates to a binder composition containing a mineral binder and a hardening accelerator as described above.

The first amino alcohol (A) and the second amino alcohol (E), as pure substance, can each comprise, relative to the mineral binder, a proportion of 0.01-6 wt %, for example, 0.01-4 wt %, for example, 0.025-3 wt %, for example, 0.05-3 wt %, or 0.08-1.5 wt %. With such proportions, an optimal effect of the hardening accelerator can be achieved.

For example, a liquifier as described above, for example, a polycarboxylate ether, is present. If present, the liquifier can comprise, relative to the mineral binder, a proportion of 0.01-6 wt %, for example, 0.1-4 wt %, for example, 0.5-3 wt %. Owing to the combination of the hardening accelerator according to the disclosure and of the liquifier, the processability of the binder composition can be improved and at the same time higher compressive strengths can be achieved. For example, the liquifier here has hardly any influence on the effect of the hardening accelerator.

In an additional exemplary embodiment, the binder composition additionally contains solid aggregates, particularly gravel, sand and/or aggregate. Such binder compositions can be used, for example, as mortar mixtures or concrete mixtures.

For example, the binder composition in addition contains water, wherein a weight ratio of water to mineral binder can be in the range of 0.25-0.8, for example, 0.3-0.6, for example, 0.35-0.5. Such binder compositions can be processed directly as mortar mixtures or concrete mixtures.

An additional aspect of the present disclosure relates to a molded body which can be obtained by curing a binder composition as described above after the addition of water. The molded body so produced can here be of almost any shape, and it can be, for example, a component of a structure, such as, for example, a building, masonry or a bridge.

Additional aspects of the disclosure relate to different uses of the hardening accelerator according to the disclosure.

For example, the hardening accelerator according to the disclosure can be used for accelerating the hardening of mineral binder compositions, for example, cementitious binder compositions.

The hardening accelerator according to the disclosure is also suitable for increasing the early compressive strength, for example, the compressive strength after 24 hours, of mineral binder compositions, for example, cementitious binder compositions.

EXAMPLES

1. Substances and Methods Used 1.1 Amino Alcohols

The following amino alcohols were used for the embodiment examples (Table 1):

TABLE 1

Amino alcohols used

| Acronyms | Substance | CAS # | Form of use |
|---|---|---|---|
| TRIS | Tris(hydroxymethyl)aminomethane | 77-86-1 | 40 wt % in $H_2O$ |
| MDEA | N-Methyldiethanolamine | 105-59-9 | Pure substance |
| DEA | Diethanolamine | 111-42-2 | 90 wt % in $H_2O$ |
| AMPD | 2-Amino-2-methyl-1,3-propanediol | 115-69-5 | 50 wt % in $H_2O$ |
| TiPA | Triisopropanolamine | 122-20-3 | 50 wt % in $H_2O$ |
| THPED | N,N,N',N'-tetrakis(2-hydroxypropyl)ethylenediamine | 102-60-3 | 50 wt % in $H_2O$ |
| MDiPA | N-Methyldiisopropanolamine | 4402-30-6 | Pure substance |

All the substances listed in Table 1 are commercially available from various suppliers in pure form (purity >97%).

TRIS, DEA, AMPD and TiPA, which are solid or highly viscous in pure form, were used in the form of aqueous solutions using the proportions of pure substances indicated in Table 1.

TRIS, MDEA, DEA and AMPD are amino alcohols which comprise exclusively primary alcohol groups. Each one of these amino alcohols comprises exactly one amine group which is in a β position relative to the hydroxyl groups.

TiPA, THPED and MDiPA are amino alcohols which comprise exclusively secondary alcohol groups as well as tertiary amine groups. The amine groups here are also in a β position relative to the hydroxyl groups.

1.2 Preparation of the Hardening Accelerators

For the comparison tests and also for the tests according to the disclosure, the hardening accelerators were admixed in each case with the mixing water for the mortar mixtures, which was subsequently used for mixing the mortar mixtures.

1.3 Additional Additives

In all the mortar tests described below, modified polycarboxylate in the form of Sika® ViscoCrete®-3081 S was used as liquifier. Sika® ViscoCrete®-3081 S is a comb polymer having a polycarboxylate backbone and polyalkylene oxide side chains bound via ester groups. The liquifier was used at a concentration of 1.0 wt % relative to the binder, and it was also admixed to the mixing water in advance.

1.4 Mortar Mixtures

The effectiveness of the hardening accelerators according to the disclosure was tested in mortar compositions. For this purpose, a mortar as specified in Table 2 was used.

TABLE 2

Dry composition consisting of the mortar mixtures used (largest grain 8 mm)

| Component | Quantity [g] |
|---|---|
| Portland cement | |
| Swiss CEM I 42.5 N Blaine fineness: 3600 $cm^2/g$ | 750 |
| Limestone filler | 141 |
| Sand 0-1 mm | 738 |
| Sand 1-4 mm | 1107 |
| Sand 4-8 mm | 1154 |

As cement, Swiss CEM I 42.5 N (=mixture of the cements Normo 4 [Siggenthal/Holcim AG], Vigier CEM I 42.5N [Vigier Ciment AG] and CEM I 42.5 N (Wildegg/Jura cement] in a weight ratio of 1:1:1) with a Blaine fineness of 3600 cm²/g was used. The sands, the limestone filler and the cement were dry mixed for 1 minute in a Hobart mixer. Within 30 seconds, the mixing water, in which the liquifier (1.0 wt % relative to cement) and optionally the hardening accelerator had been dissolved or dispersed, was added and mixed for an additional 2.5 minutes. The total wet mixing time was 3 minutes in each case. The water/cement value (w/z value) is consistently 0.4.

1.5 Test Procedure

For the determination of the effectiveness of the hardening accelerator according to the disclosure, the compressive strength of the mortar mixtures was determined 24 h hours or 1 day (1 d) as well as 7 days (7 d) after the mixing of the mortar mixtures. In the process, the respective slump (SLP) was also measured after the mixing of the mortar mixtures.

The test for verifying the determination of the compressive strength (in N/mm²) was carried out using prisms (40×40× 160 mm) according to the standard EN 12390-1 to 12390-4. The flow table spread (FTS) of the mortar was determined according to EN 1015-3.

2. Individual Amino Alcohols

The amino alcohols mentioned in section 1.1 above were used for comparison purposes individually and at different dosages as hardening accelerators in mortar tests (tests M1-M14).

Subsequently, as described above (section 1.4), the compressive strength and the slump of the respective mortar mixtures were determined. R is a reference sample, which contains no acceleration hardener or amino alcohol, but otherwise has the same composition as the tests M1-M14.

Table 3 provides an overview of the effect of the different amino alcohols in mortar mixtures. The amino alcohols here have been marked "A" or "E" with regard to their structural type. "A" types correspond to the above described first amino alcohols having a primary alcohol group, while "E" types correspond to the second amino alcohols having secondary alcohol groups.

For each amino alcohol, two dosages are indicated in each case: one dosage corresponds to the optimal dosage, which yields the best possible compressive strength increase for the respective amino alcohol. An additional and less effective dosage is indicated in each case for comparison purposes.

The dosages relate to the binder content or to the cement content present in the mortar mixture. For TRIS, DEA, AMPD, TiPA and THPED, the dosages refer to the solutions indicated in section 1.1, and for the remaining amino alcohols to the respective undiluted substance in pure form (purity >97%).

TABLE 3

Effect of individual amino alcohols at different dosages.

| No. | Amino alcohol (Type) | Dosage [wt %] | FTS [mm] | 1 d | Δ (1 d) | 7 d | Δ (7 d) |
|---|---|---|---|---|---|---|---|
| R | Without (Reference) | 0 | 194 | 31.1 | 0% | 58.1 | 0% |

TABLE 3-continued

Effect of individual amino alcohols at different dosages.

| No. | Amino alcohol (Type) | Dosage [wt %] | FTS [mm] | 1 d | Δ (1 d) | 7 d | Δ (7 d) |
|---|---|---|---|---|---|---|---|
| M1 | TRIS (A) | 0.1 | 200 | 30.3 | −3% | 59.0 | +2% |
| M2 |  | 0.4 | 192 | 32.2 | +4% | 58.0 | 0% |
| M3 | MDEA (A) | 0.05 | 201 | 36.9 | +13% | 62.0 | +7% |
| M4 |  | 0.15 | 191 | 37.0 | +13% | 59.6 | +3% |
| M5 | DEA (A) | 0.1 | 186 | 30.3 | −3% | 57.3 | −1% |
| M6 |  | 0.3 | 182 | 34.5 | +11% | 59.9 | +3% |
| M7 | AMPD (A) | 0.3 | 186 | 33.6 | +8% | 59.8 | +3% |
| M8 |  | 0.9 | 188 | 35.5 | +14% | 60.4 | +4% |
| M9 | TiPA (E) | 0.1 | 196 | 35.1 | +13% | 63.7 | +10% |
| M10 |  | 0.3 | 195 | 35.2 | +13% | 63.3 | +9% |
| M11 | THPED (E) | 1.0 | 175 | 36.4 | +13% | 62.1 | +7% |
| M12 |  | 2.0 | 165 | 35.7 | +11% | 61.2 | +5% |
| M13 | MDiPA (E) | 0.3 | 192 | 34.8 | +16% | 61.7 | +6% |
| M14 |  | 0.9 | 183 | 34.5 | +15% | 58.7 | +1% |

Columns "1 d" and "7 d" indicate the compressive strengths after 1 day or 7 days.
Columns "Δ (1 d)" and "Δ (7 d)" indicate the percentage change of the respective compressive strength relative to the reference sample R.

3. Hardening Accelerators According to the Disclosure

Table 4 provides an overview of different mortar tests (M21-M34) with hardening accelerators according to the disclosure. R is again a reference sample which contains no hardening accelerator or amino alcohol, but otherwise has the same composition as the tests M21-M34.

The hardening accelerators according to the disclosure here consist of a first amino alcohol (A) (column A in Table 2; structural type "A") and a second amino alcohol E (column E in Table 2; structural type "E"). In parentheses, the respective dosage of the amino alcohols (wt % relative to cement) is indicated. With regard to the dosages, the same applies as already indicated in section 1.4.

For each mortar test, in the column "compressive strength increase," the respective percentage increase of the compressive strength due to the hardening accelerators according to the disclosure in comparison to the reference sample R after 1 day [column "Δ (1 d)"] and 7 days [column "Δ (7 d)"] is indicated.

The effect of the acceleration hardeners was also classified in accordance with the following 4 categories:

Category "−": The increase in the compressive strength with a hardening accelerator (combination of amino alcohols (A) and (E)) is lower than the increase in the compressive strengths with the better of the two individual components (amino alcohol (A) or amino alcohol (E));

Category "=": The increase in the compressive strength with a hardening accelerator is equal to the increase in the compressive strength with the better of the two individual components;

Category "+": The increase in the compressive strength with a hardening accelerator is greater than the increase in the compressive strength with the better of the two individual components;

Category "++": The increase in the compressive strength with a hardening accelerator is greater than the sum of the compressive strength increases of the two individual components added together.

The appropriate category is recorded in each case in the "Cat." column in Table 4.

TABLE 4

Effect of the hardening accelerator according to the disclosure.

| No. | A (Dosage) | E (Dosage) | Δ (1 d) | Cat. | Δ (7 d) | Cat. |
|---|---|---|---|---|---|---|
| R | Without | Without | 0% | = | 0% | = |
| M21 | TRIS (0.4%) | TiPA (0.1%) | +20% | ++ | +10% | = |
| M22 | | TiPA (0.3%) | +21% | ++ | +11% | ++ |
| M23 | | THPED (1.0%) | +22% | ++ | +6% | − |
| M24 | | THPED (2.0%) | +21% | ++ | +8% | ++ |
| M25 | | MDiPA (0.3%) | +22% | ++ | +7% | ++ |
| M26 | | MDiPA (0.9%) | +17% | + | +5% | ++ |
| M27 | TRIS (0.1%) | TiPA (0.1%) | +16% | ++ | +11% | + |
| M28 | | MDiPA (0.3%) | +17% | ++ | +6% | = |
| M29 | DEA (0.1%) | TiPA (0.3%) | +19% | ++ | +11% | ++ |
| M30 | | THPED (1.0%) | +19% | ++ | +8% | ++ |
| M31 | | MDiPA (0.3%) | +19% | ++ | +8% | ++ |
| M32 | MDEA (0.15%) | THPED (1.0%) | +20% | + | +1% | − |
| M33 | AMPD (0.9%) | MDiPA (0.3%) | +18% | + | +4% | − |
| M34 | AMPD (0.3%) | THPED (1.0%) | +19% | + | +10% | + |

If one compares, for example, hardening accelerators consisting of combinations of TRIS at the dosage of best effectiveness (0.4 wt %) with TIPA, THPED and MDiPA (Tests M21-M26), then, after 1 day, compressive strength increases are consistently achieved which are higher than the compressive strength increases of the respective individual amino alcohols (Category "+"). In the tests M21-M25, the compressive strength increases are even higher than the sum of the compressive strength increases of the individual amino alcohols (Category "++"). This is particularly surprising given that TRIS as individual substance does not produce a particularly remarkable compressive strength increase (Table 3). Similar results were also obtained after 7 days with most of the combinations.

Similar results were obtained even with hardening accelerators consisting of combinations of TRIS at the less effective dosage (0.1 wt %) with TiPA and MDiPA (tests M27 and M28). Here, the following is noted in particular: TiPA and MDiPA at the optimal dosages produce, as individual substances, a compressive strength increase of only 13% and 12%, respectively (see Table 3). At the used dosage of 0.1%, TRIS, as an individual substance, even results in a compressive strength decrease of −3% (see Table 3). According to the inventive combination (tests M27 and M28), however, compressive strength increases of 16% and 17%, respectively, are achieved, which is clearly higher than the individual components of best effectiveness (TiPA and MDiPA, respectively) and also clearly higher than the sum of the compressive strength increases of the individual components added together (see Table 4).

A similar picture is obtained for hardening accelerators consisting of DEA and in each case one amino alcohol of structural type E, namely TiPA, THPED and MDiPA (tests M29-M31). Even if DEA is used at the less satisfactory concentration of 0.1%, in the interaction with TiPA, THPED and MDiPA at optimal concentrations, compressive strength increases are achieved that are significantly higher than the values that can be achieved with the individual components of best effectiveness, and also clearly higher than the sum of the compressive strength increases of the individual components added together (see Table 4).

It is also surprising that the effect of the amino alcohol of structural type A (MDEA) which has the best effectiveness as individual substance can be increased further by combination with the amino alcohol of structural type E (THPED) which has the best effectiveness (see test M32). The corresponding hardening accelerator based on MDEA and THPED is thus more effective than the individual component (MDEA) of best effectiveness of the amino alcohol combination.

Acceleration hardeners based on AMPD and THPED or MDiPA represent advantageous combinations (see tests M33 and M34).

4. Comparison Tests

For comparison purposes, hardening accelerators not according to the disclosure, based on combinations of different amino alcohols of structural type A were examined (Tests V1-V6 in Table 5). Here, in each case, an amino alcohol of structural type A at the dosage of best effectiveness was tested with an additional amino alcohol of structural type A also at the dosage of best effectiveness. Table 5 provides a corresponding overview of the results. R is again a reference sample, which contains no hardening accelerator or amino alcohol, but which otherwise has the same composition as the comparison tests V1-V6.

TABLE 5

Comparative combinations of amino alcohols of structural type A.

| No. | A (Dosage) | A (Dosage) | Δ (1 d)[1] | Cat. | Δ (7 d)[2] | Cat. |
|---|---|---|---|---|---|---|
| R | Without | Without | 0% | = | 0% | = |
| V1 | TRIS (0.4%) | MDEA (0.15%) | +12% | − | +4% | + |
| V2 | | DEA (0.3%) | +7% | − | +1% | − |
| V3 | | AMPD (0.9%) | +1% | − | +2% | − |
| V4 | MDEA (0.15%) | DEA (0.3%) | +11% | − | −2% | − |
| V5 | | AMPD (0.9%) | +12% | − | −1% | − |
| V6 | DEA (0.3%) | AMPD (0.9%) | +8% | − | −8% | − |

Similar tests were also carried out with combinations of amino alcohols of structural type E (tests V7-V9 in Table 6).

TABLE 6

Comparative combinations of amino alcohols of structural type E.

| No. | E (Dosage) | E (Dosage) | Δ (1 d)[1] | Cat. | Δ (7 d)[2] | Cat. |
|---|---|---|---|---|---|---|
| R | Without | Without | 0% | = | 0% | = |
| V7 | TiPA (0.3%) | THPED (1.0%) | +13% | − | +6% | − |
| V8 | | MDiPA (0.3%) | +13% | − | +1% | − |
| V9 | THPED (1.0%) | MDiPA (0.3%) | +15% | − | +6% | − |

As one can see from the results in Tables 5 and 6, comparative combinations of amino alcohols in no case result in increases of the compressive strengths in comparison to the individual component of best effectiveness. In most cases, a significant worsening is even produced.

The above-described exemplary embodiments are only used as illustrative examples which can be modified as desired in the context of the disclosure.

For example, it has been found, for example, that the inventive amino alcohol pairs used for the tests M21-M34 can also be mixed in advance with each other and then added only subsequently to the mixing water.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A hardening accelerator for a mineral binder composition, the hardening accelerator comprising:
   a) a first amino alcohol (A) and
   b) a second amino alcohol (E),
   wherein the first amino alcohol (A) is tris(hydroxymethyl)aminomethane and/or N-methyldiethanolamine, and wherein the second amino alcohol (E) is N-methyldiisopropanolamine.

2. The hardening accelerator according to claim 1, wherein a weight ratio of the first amino alcohol (A) to the second amino alcohol (E) is in the range of 100:1-1:100.

3. The hardening accelerator according to claim 1, further comprising at least one of a concrete additive and/or a mortar additive.

4. The hardening accelerator according to claim 1, further comprising at least one additive that is a liquifier.

5. The hardening accelerator according to claim 1, wherein a weight ratio of the first amino alcohol (A) to the second amino alcohol (E) is in the range of 50:1-1:50.

6. The hardening accelerator according to claim 1, wherein a weight ratio of the first amino alcohol (A) to the second amino alcohol (E) is in the range of 10:1-1:10.

7. The hardening accelerator according to claim 4, wherein the liquifier is a polycarboxylate.

8. The hardening accelerator according to claim 4, wherein the liquifier is a comb polymer comprising a polycarboxylate backbone having polyether side chains bound via ester, ether and/or amide groups.

9. A binder composition, comprising:
   a mineral binder, and
   the hardening accelerator according to claim 1.

10. The binder composition according to claim 9, wherein the first amino alcohol (A) and the second amino alcohol (E), relative to the mineral binder, in each case comprise a proportion of 0.01-6 M.

11. The binder composition according to claim 9, wherein the mineral binder is a cementitious binder.

12. The binder composition according to claim 9, wherein the mineral binder is a hydraulic binder.

13. The binder composition according to claim 9, wherein the first amino alcohol (A) and the second amino alcohol (E), relative to the mineral binder, in each case comprise a proportion of 0.01-4 wt %.

14. The binder composition according to claim 9, wherein the first amino alcohol (A) and the second amino alcohol (E), relative to the mineral binder, in each case comprise a proportion of 0.025-3 wt %.

15. The binder composition according to claim 9, wherein the first amino alcohol (A) and the second amino alcohol (E), relative to the mineral binder, in each case comprise a proportion of 0.05-3 wt %.

16. The binder composition according to claim 9, wherein the first amino alcohol (A) and the second amino alcohol (E), relative to the mineral binder, in each case comprise a proportion of 0.08-1.5 wt %.

17. A molded body obtained by curing the binder composition according to claim 9 after an addition of water.

18. A method for preparing a mineral binder composition, the method comprising adding the hardening accelerator according to claim 1 to a mineral binder.

* * * * *